(12) United States Patent
Shinohara

(10) Patent No.: US 9,742,221 B2
(45) Date of Patent: Aug. 22, 2017

(54) POWER SUPPLY DEVICE, POWER SUPPLY METHOD, AND PROGRAM

(71) Applicant: CANON KABUSHIKI KAISHA, Tokyo (JP)

(72) Inventor: Taku Shinohara, Kawasaki-shi (JP)

(73) Assignee: Canon Kabushiki Kaisha, Tokyo (JP)

( * ) Notice: Subject to any disclaimer, the term of this patent is extended or adjusted under 35 U.S.C. 154(b) by 608 days.

(21) Appl. No.: 14/264,456

(22) Filed: Apr. 29, 2014

(65) Prior Publication Data

US 2014/0319922 A1    Oct. 30, 2014

(30) Foreign Application Priority Data

Apr. 30, 2013    (JP) .................................. 2013-095507

(51) Int. Cl.
| | |
|---|---|
| H02J 17/00 | (2006.01) |
| H04B 5/00 | (2006.01) |
| H02J 7/00 | (2006.01) |
| H02J 7/02 | (2016.01) |

(52) U.S. Cl.
CPC ............ *H02J 17/00* (2013.01); *H04B 5/0037* (2013.01); *H02J 7/0047* (2013.01); *H02J 7/025* (2013.01); *H02J 2007/005* (2013.01)

(58) Field of Classification Search
CPC .......... H02J 17/00; H02J 7/0047; H02J 7/025; H02J 2007/005; H04B 5/0037

USPC .......................................................... 307/104
See application file for complete search history.

(56) References Cited

U.S. PATENT DOCUMENTS

| | | | | |
|---|---|---|---|---|
| 2012/0153742 A1* | 6/2012 | Lee | .......................... | H02J 17/00 307/104 |
| 2012/0313446 A1* | 12/2012 | Park | ...................... | H04B 5/0037 307/104 |
| 2013/0119778 A1* | 5/2013 | Jung | ....................... | H01F 38/14 307/104 |

FOREIGN PATENT DOCUMENTS

| | | |
|---|---|---|
| JP | 2009-136132 A | 6/2009 |
| JP | 2009268311 A | 11/2009 |
| JP | 2011205788 A | 10/2011 |

\* cited by examiner

*Primary Examiner* — Rexford Barnie
*Assistant Examiner* — Toan Vu
(74) *Attorney, Agent, or Firm* — Canon U.S.A., Inc. IP Division

(57) ABSTRACT

A power supply device includes a power supply unit that wirelessly supplies power to a power reception device, a reception unit that receives an interrupt request from a second power reception device during power supply to a first power reception device by the power supply unit, a determination unit that determines whether the interrupt of the second power reception device is to be permitted, and a power supply control unit that stops the power supply to the first power reception device and starts power supply to the second power reception device when the determination unit has determined that the interrupt is to be permitted.

8 Claims, 10 Drawing Sheets

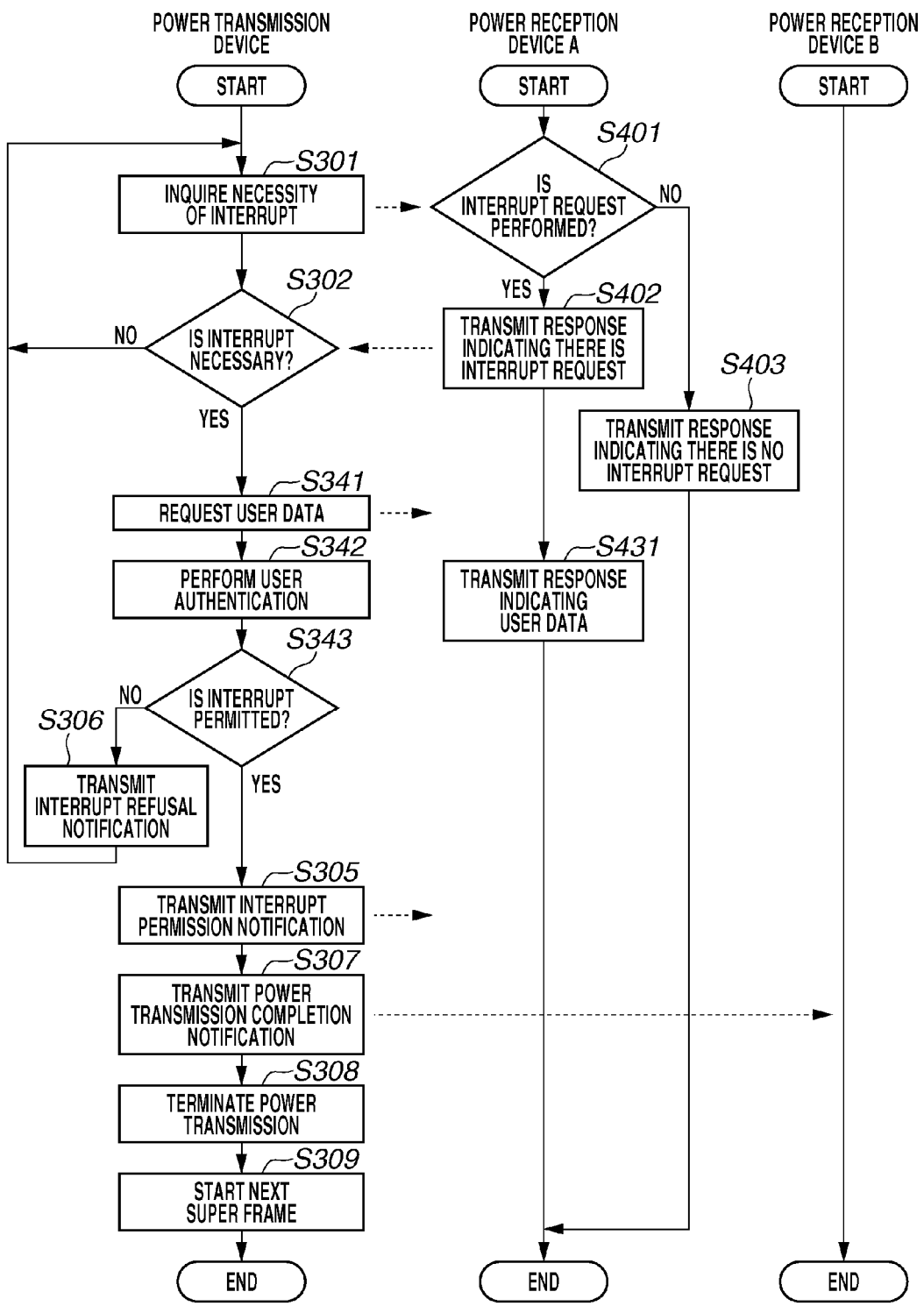

POWER SUPPLY DEVICE, POWER SUPPLY METHOD, AND PROGRAM

BACKGROUND

Field

Aspects of the present invention generally relate to a power supply device, a power supply method, and a program.

Description of the Related Art

Conventionally, a technology for supplying power in a non-contact (wireless) manner exists. As a non-contact power supply system, there are four systems described below. That is, an electromagnetic induction system, a magnetic field resonance system, an electric field coupling system, and a radio wave reception system. Among them, the magnetic field resonance system can transmit sufficient power to a long distance as its feature. Thus, the magnetic field resonance system has particularly drawn attention among the four systems. In the magnetic field resonance system, a 1 to N power supply system has been discussed which utilizes the long power transmission distance. In the 1 to N power supply, a power transmission device wirelessly transmits power to a plurality of reception devices (for example, see Japanese Patent Application Laid-Open No. 2009-136132).

According to the technology of Japanese Patent Application Laid-Open No. 2009-136132, the power transmission device transmits a fixed pulse signal in a stand-by mode, when the power transmission device are not transmitting power, to find whether a power reception device is present in its proximity within a several meters. When the reception device transmits its own unique identification (ID) to the power transmission device, the power transmission device determines whether a transmission source of the unique ID is a power reception device as a power supply target. When the power reception device is the power supply target, the power transmission device supplies the power to the power reception device. At this time, the power transmission device can transmit a unique code to the power reception device so that the power transmission device individually receives a charge amount, a state of the device, and the like by.

When a processing period for confirming whether the power reception device wishes to receive power is over, the power transmission device starts to supply the power to the power reception device, which has been determined as a power transmission destination. During a period in which the power transmission device supplies the power, the power transmission device cannot receive a power reception request from other power reception devices.

For example, assume that a first power reception device needs to be immediately charged due to reduction in a battery residual capacity, and the like.

Further, suppose that, at this time, the power transmission device is in the middle of supplying the power to a second power reception device. In this case, there is a problem that the power transmission device cannot supply the power to the first power reception device until the power supply period for supplying the power to the second power reception device is over.

SUMMARY

Aspects of the present invention are generally directed to supplying power to a power reception device at an appropriate timing.

According to an aspect of the present invention, a power supply device includes a power supply unit configured to wirelessly supply power to a power reception device, a reception unit configured to receive an interrupt request from a second power reception device during power supply to a first power reception device by the power supply unit, a determination unit configured to determine whether interrupt of the second power reception device is to be permitted, and a power supply control unit configured to, when the determination unit determines that the interrupt is to be permitted, stop the power supply to the first power reception device and to start power supply to the second power reception device.

Further features of the present disclosure will become apparent from the following description of exemplary embodiments with reference to the attached drawings.

BRIEF DESCRIPTION OF THE DRAWINGS

FIG. 10 is a flowchart illustrating interrupt management processing.

DESCRIPTION OF THE EMBODIMENTS

Various exemplary embodiments will be described in detail below with reference to the drawings.

Figure 1:
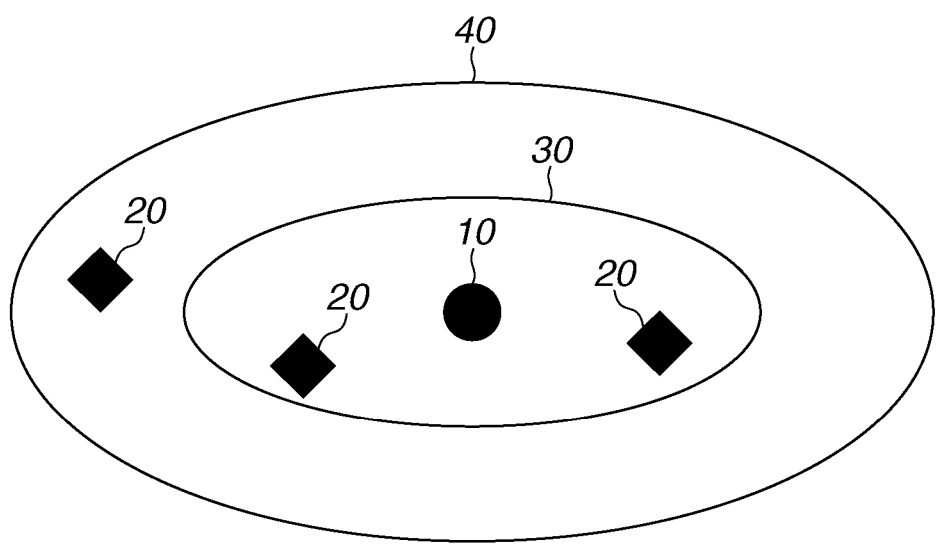
FIG. 1 is a diagram illustrating a wireless power supply system.

FIG. 1 is a diagram illustrating a wireless power supply system. The wireless power supply system includes a power transmission device 10 as a power supply device and a plurality of power reception devices 20. The power transmission device 10 wirelessly supplies the power to the power reception device 20 in a non-contact manner. The power transmission device 10 also performs data communication necessary for the power supply, with the power reception device 20. The power reception device 20 wirelessly receives the power from the power transmission device 10. The power reception device 20 also performs data communication necessary for the power supply, with the power transmission device 10.

A power supply area 30 illustrated in FIG. 1 is an area in which the power supply can be executed from the power transmission device 10 to the power reception devices 20. The power supply area 30 is a range determined by a power transmission capability of the power transmission device 10. A communication area 40 is an area in which the data communication can be executed between the power transmission device 10 and the power reception devices 20.

A relationship between the power supply area 30 and the communication area 40 will be described. The power supply area 30 is an area narrower than the communication area 40.

To be specific, the power supply area 30 is included within the communication area 40. As illustrated in FIG. 1, when a plurality of power reception devices 20 exists in the power supply area 30, the power transmission device 10 can execute wireless power supply to the plurality of power reception devices 20.

Figure 2:
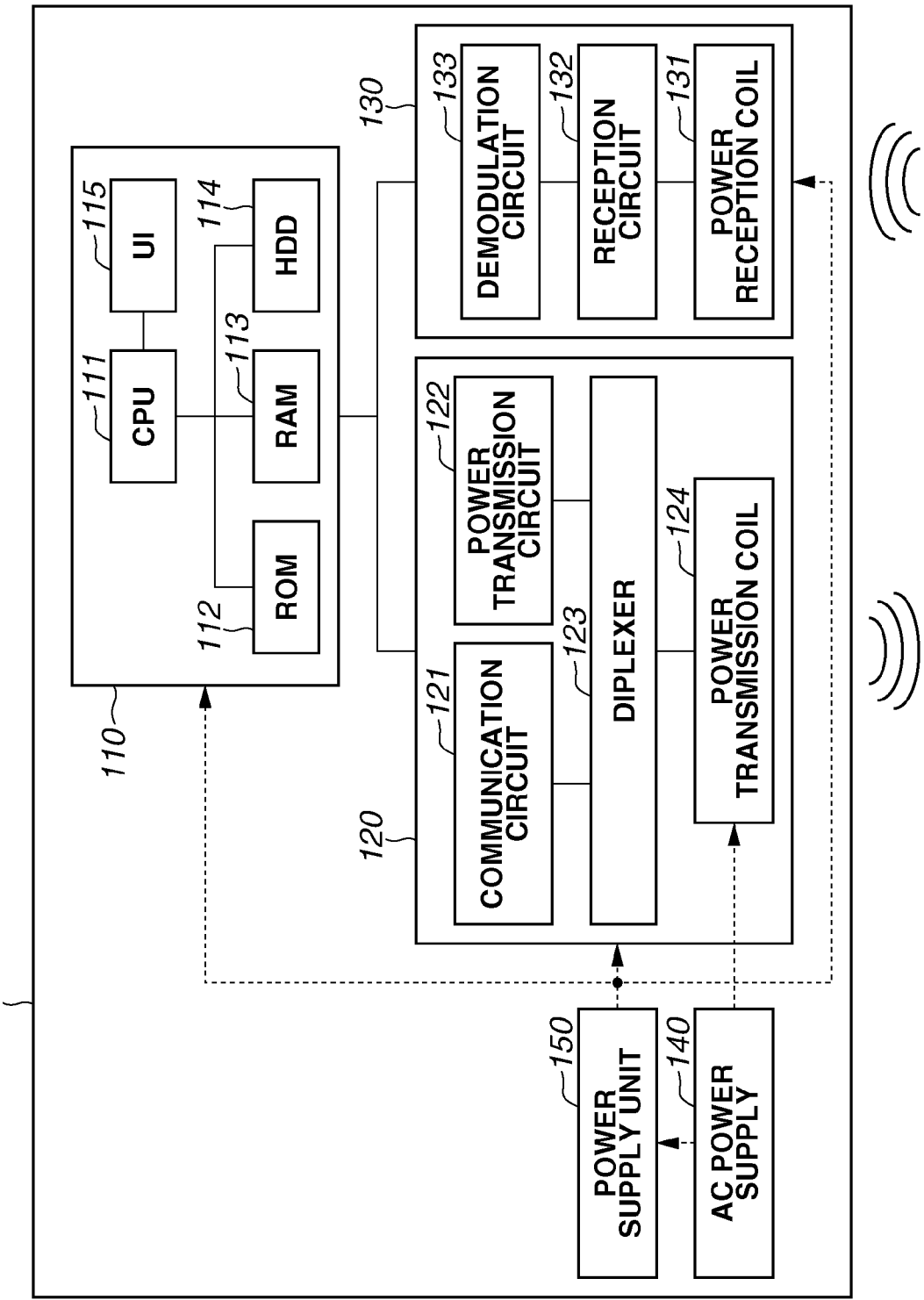
FIG. 2 is a diagram illustrating a power transmission device.

FIG. 2 is a diagram illustrating the power transmission device 10. In FIG. 2, exchange of data is illustrated by the solid line, and supply of the power is illustrated by the dotted line. The power transmission device 10 includes a control unit 110, a wireless transmission unit 120, a wireless reception unit 130, an alternating current (AC) power supply 140, and a power supply unit 150.

The control unit 110 controls the power transmission device 10. The control unit 110 includes a central processing unit (CPU) 111, a read only memory (ROM) 112, a random access memory (RAM) 113, a hard disk drive (HDD) 114, and a user interface (UI) 115. The control unit 110 is connected with the wireless transmission unit 120 and the wireless reception unit 130 by an internal bus.

The CPU 111 processes various data items to control the power transmission device 10. The ROM 112 is a non-volatile storage medium, and stores a boot program, and the like used by the CPU 111. The RAM 113 is a volatile storage medium, and temporarily stores data, programs, and the like used by the CPU 111. The HDD 114 is a non-volatile storage medium, and stores an OS, applications, and the like used by the CPU 111.

The UI 115 is an operation input unit that receives an operation input from the user. In addition, the UI 115 is a display unit that displays various types of information. The UI 115 includes, for example, a liquid crystal display unit and a touch panel. A press of the touch panel is detected by the CPU 111.

The wireless transmission unit 120 wirelessly transmits the power to the power reception device 20. The wireless transmission unit 120 includes a communication circuit 121, a power transmission circuit 122, a diplexer 123, and a power transmission coil 124. The communication circuit 121 generates a modulation signal for performing communication. The power transmission circuit 122 generates a modulation signal for transmitting the power.

The diplexer 123 combines the modulation signal generated by the communication circuit 121 and the modulation signal generated by the power transmission circuit 122. The power transmission coil 124 transmits the modulation signal combined by the diplexer 123 to the power reception device 20.

The wireless reception unit 130 receives data from the power reception device 20. The wireless reception unit 130 includes a power reception coil 131, a reception circuit 132, and a demodulation circuit 133. The power reception coil 131 receives the modulation signal for performing communication, from the power reception device 20. The reception circuit 132 receives the modulation signal received by the power reception coil 131. The demodulation circuit 133 demodulates the modulation signal received by the power reception coil 131.

The AC power supply 140 supplies an AC voltage to the power transmission coil 124 and the power supply unit 150. The power supply unit 150 converts the AC voltage supplied by the AC power supply 140 into a direct current (DC) voltage, and supplies the DC voltage to the control unit 110, the wireless transmission unit 120, and the wireless reception unit 130.

Note that functions and processing of the power transmission device 10 described below are realized in such a way that the CPU 111 reads the programs stored in the ROM 112 or the HDD 114, and executes the programs.

Figure 3:
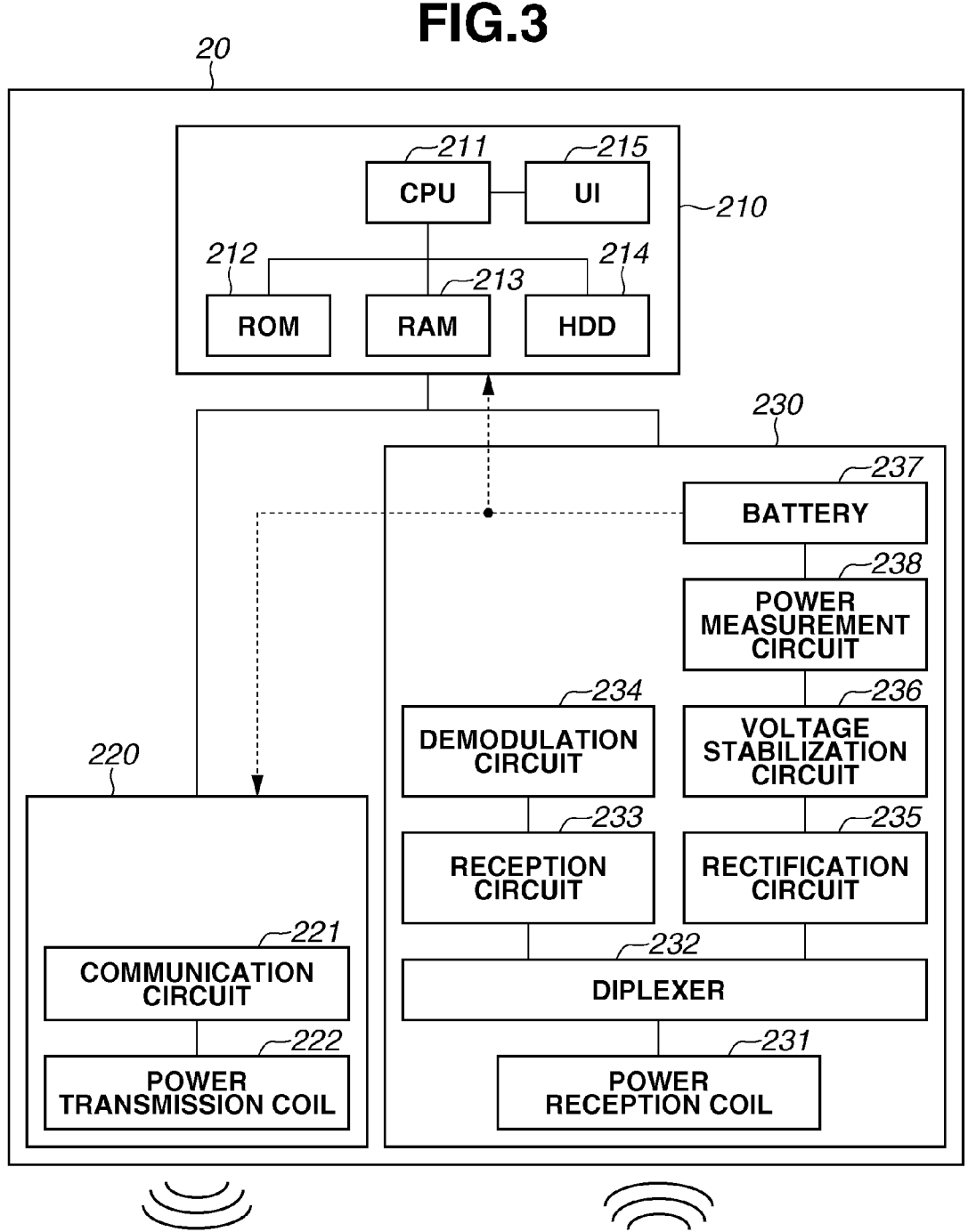
FIG. 3 is a diagram illustrating a power reception device.

FIG. 3 is a diagram illustrating the power reception device 20. In FIG. 3, exchange of data is illustrated by the solid line, and supply of the power is illustrated by the dotted line. The power reception device includes a control unit 210, a wireless transmission unit 220, and a wireless reception unit 230. The control unit 210 controls the power reception device 20. The control unit 210 includes a CPU 211, a ROM 212, a RAM 213, an HDD 214, and a UI 215. The control unit 210 is connected with the wireless transmission unit 220 and the wireless reception unit 230 by an internal bus.

The CPU 211 processes various data items to control the power reception device 20. The ROM 212 is a non-volatile storage medium, and stores a boot program, and the like used by the CPU 211. The RAM 213 is a volatile storage medium, and temporarily stores data, programs, and the like used by the CPU 211. The HDD 214 is a non-volatile storage medium, and stores an operating system (OS) and applications used by the CPU 211. The UI 215 displays various types of information to the user, and receives various instructions from the user.

The wireless transmission unit 220 transmits data to the power transmission device 10. The wireless transmission unit 220 includes a communication circuit 221 and a power transmission coil 222. The communication circuit 221 generates a modulation signal for performing communication. The power transmission coil 222 transmits the modulation signal generated by the communication circuit 221 to the power transmission device 10.

The wireless reception unit 230 wirelessly receives the power from the power transmission device 10. The wireless reception unit 230 includes a power reception coil 231, a diplexer 232, a reception circuit 233, a demodulation circuit 234, a rectification circuit 235, a voltage stabilization circuit 236, a power measurement circuit 238, and a battery 237. The power reception coil 231 receives the modulation signal from the power transmission device 10. The diplexer 232 sorts out the modulation signals received by the power reception coil 231 into the modulation signal for performing communication and the modulation signal for transmitting the power. The reception circuit 233 receives the modulation signal for performing communication sorted out by the diplexer 232.

The demodulation circuit 234 demodulates the modulation signal. The rectification circuit 235 rectifies the modulation signal for transmitting the power sorted out by the diplexer 232 to generate a DC voltage. The voltage stabilization circuit 236 stabilizes the DC voltage generated by the rectification circuit 235. The power measurement circuit 238 measures the power of the stabilized DC power supply generated by the voltage stabilization circuit 236. The battery 237 receives the voltage stabilized by the voltage stabilization circuit 236, and stores the power. In addition, the battery 237 supplies the DC voltage to the control unit 210, the wireless transmission unit 220, and the wireless reception unit 230 based on the stored voltage.

Note that functions and processing of the power reception device 20 described below are realized in such a way that the CPU 211 reads the programs stored in the ROM 212 or the HDD 214, and executes the programs.

Figure 4:
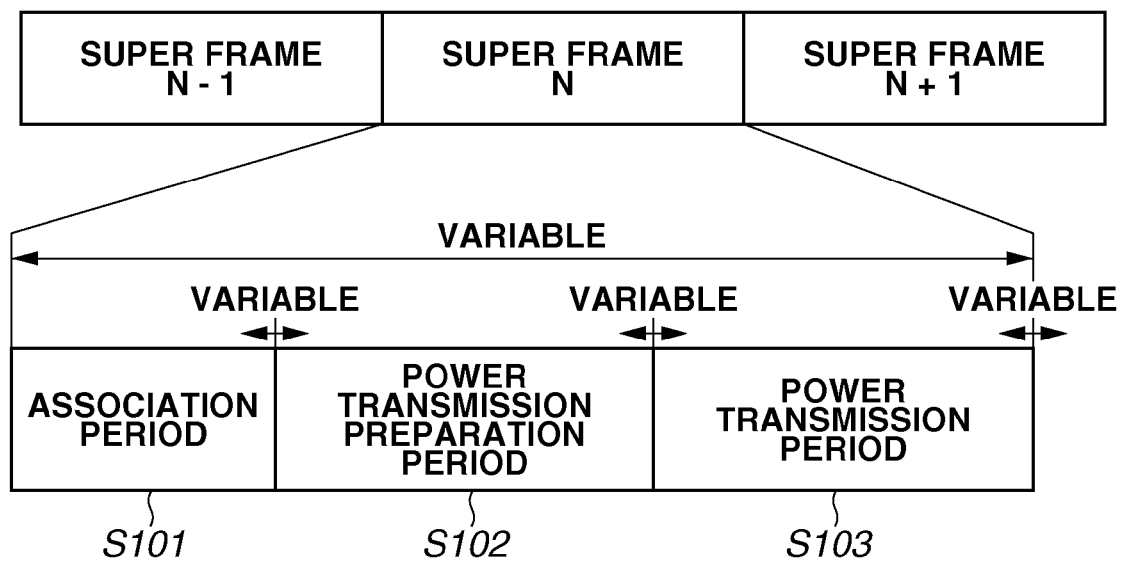
FIG. 4 is a diagram illustrating an example of a super frame.

FIG. 4 is a diagram illustrating an example of a super frame. The wireless power supply system according to the present exemplary embodiment performs the power transmission processing by repeating such a super frame. A single super frame includes steps S101 (association period), S102

(power transmission preparation period), and S103 (power transmission period). Note that each period is variable.

In step S101, the power transmission device 10 confirms with the power reception device 20 an ID and necessity of power. When the power transmission device 10 has received a device ID and the necessity of power from the power reception device 20, the operation proceeds to step S102. Note that the period transferring from step S101 to step S102 is also variable.

In step S102, the power transmission device 10 can transmit a data request to the power reception device 20. The power transmission device 10 can request a device ID of the power transmission device 10 in the data request. Further, the power reception device 20 can transmit acknowledge as a response to the data request from the power transmission device 10. The power reception device 20 transmits the acknowledge including the device ID in response to the request of the device ID. Note that the length of each response frame and the length of an acknowledge frame are variable. When step S102 is over, the power transmission device 10 advances the operation to step S103. Note that the period transferring from step S102 to step S103 is also variable.

In step S103, the power transmission device 10 transmits the power to the power reception device 20. In step S103, the power reception device 20 can transmit a frame to the power transmission device 10 even if there is no request frame from the power transmission device 10.

Figure 5:
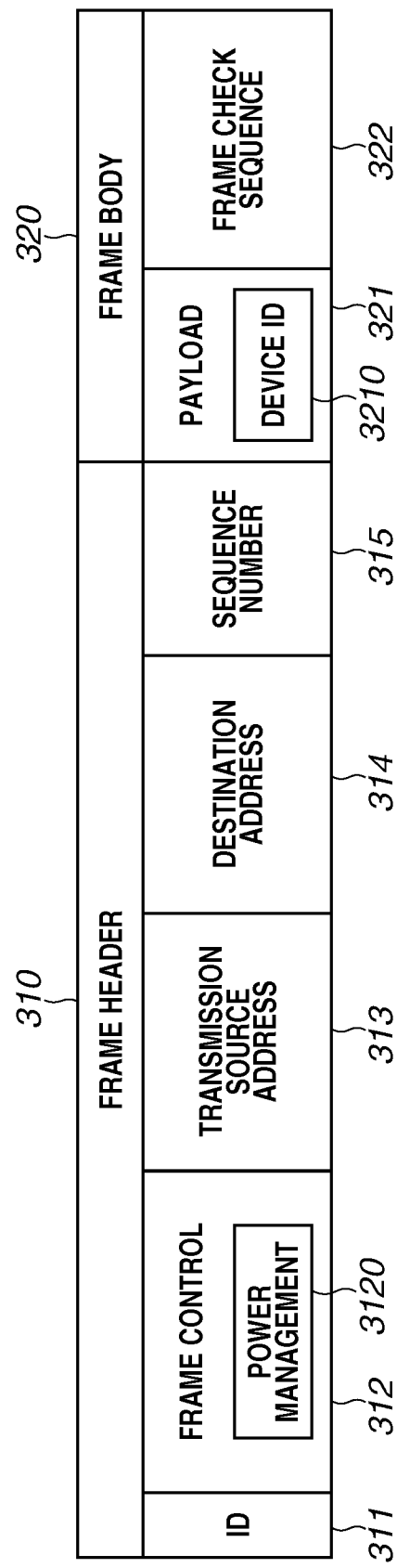
FIG. 5 is a diagram illustrating an example of a frame format.

FIG. 5 is a diagram illustrating an example of a frame format. In the above-described super frame, data communication using a packet of a frame format as illustrated in FIG. 5 is realized. With the data communication, transmission/reception of data necessary for starting wireless power supply is performed.

A frame header 310 indicates a destination, and the like at the time of data transfer. The frame header 310 includes an ID 311, a frame control 312, a transmission source address 313, a destination address 314, and a sequence number 315. The ID 311 is an ID used when the data communication is performed in the wireless power supply system.

The frame control 312 is information for data exchange of the power reception device 20. The frame control 312 includes power management 3120. The power management 3120 is data that confirms necessity of power. The transmission source address 313 is an address of a transmission source at the time of data transfer. The destination address 314 is an address of a destination at the time of data transfer. The sequence number 315 is a number of the frame.

A frame body 320 is information of a data body at the time of data transfer. The frame body 320 includes a payload 321 and a frame check sequence 322. The payload 321 is the data body. A device ID 3210 is allocated to the payload 321, for example. The device ID 3210 is identification information of the power reception device 20. The frame check sequence 322 is data that performs an error check of the payload 321.

Figure 6:
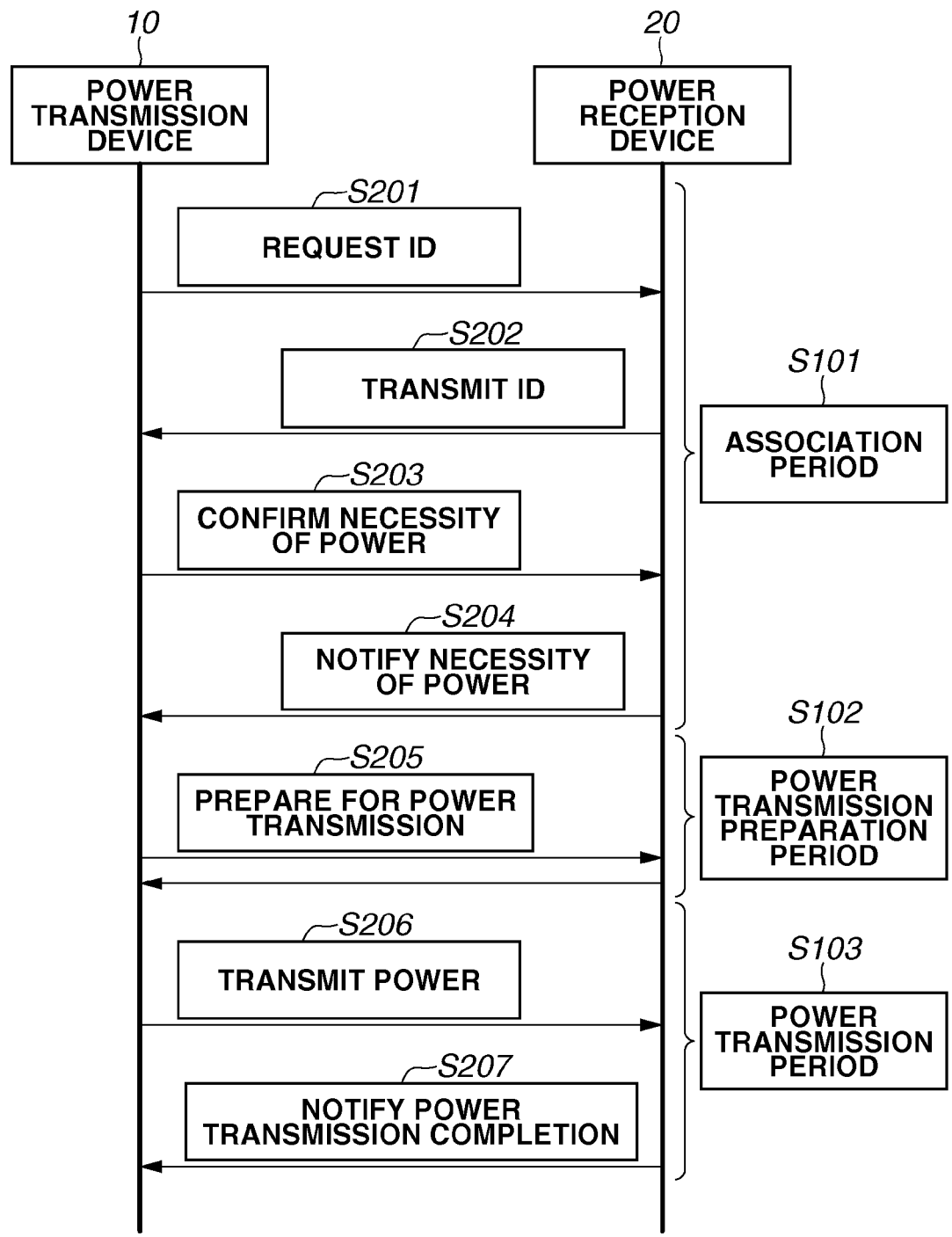
FIG. 6 is a sequence diagram illustrating power transmission processing.

FIG. 6 is a sequence diagram illustrating power transmission processing between the power transmission device 10 and the power reception device 20 in the super frame. In the above-described super frame, data communication for wireless power transmission is realized by performing the processing described below.

In step S201, the power transmission device 10 requests the power reception device 20 for an ID. At this time, the power transmission device 10 uses the ID 311 of the frame format.

Next, in step S202, the power transmission device 10 receives an ID from the power reception device 20. At this time, the power transmission device 10 uses the ID 311 of the frame format. Next, in step S203, the power transmission device 10 confirms the necessity of power with the power reception device 20. At this time, the power transmission device 10 uses the power management 3120 of the frame format.

Next, in step S204, the power reception device 20 notifies the power transmission device 10 of the necessity of power if the power is necessary in the power reception device 20. Further, in step S204, the power reception device 20 notifies the power transmission device 10 of unnecessity of power if the power is not necessary. At this time, the power reception device 20 uses the power management 3120 of the frame format. The power transmission device 10 then determines the power reception device 20 to which power is transmitted based on a response result of the necessity of power.

Next, in step S205, the power transmission device 10 performs preparation of power transmission. That is, the power transmission device 10 requests the power reception device 20 for a device ID as a data request. At this time, the power transmission device 10 uses the device ID 3210 of the frame format.

Next, the power reception device 20 transmits the device ID to the power transmission device 10 as a response frame. At this time, the power reception device 20 uses the device ID 3210 of the frame format.

Next, in step S206, the power transmission device 10 transmits the power to the power reception device 20 (power supply processing). Next, in step S207, when the battery 237 is fully charged, the power reception device 20 notifies the power transmission device 10 of power transmission completion. At this time, the power reception device 20 uses the power management 3120 of the frame format. One super frame has then been completed. As described above, by performing the data transmission/reception processing in the super frame, the data communication for the wireless power transmission can be realized.

Figure 7:
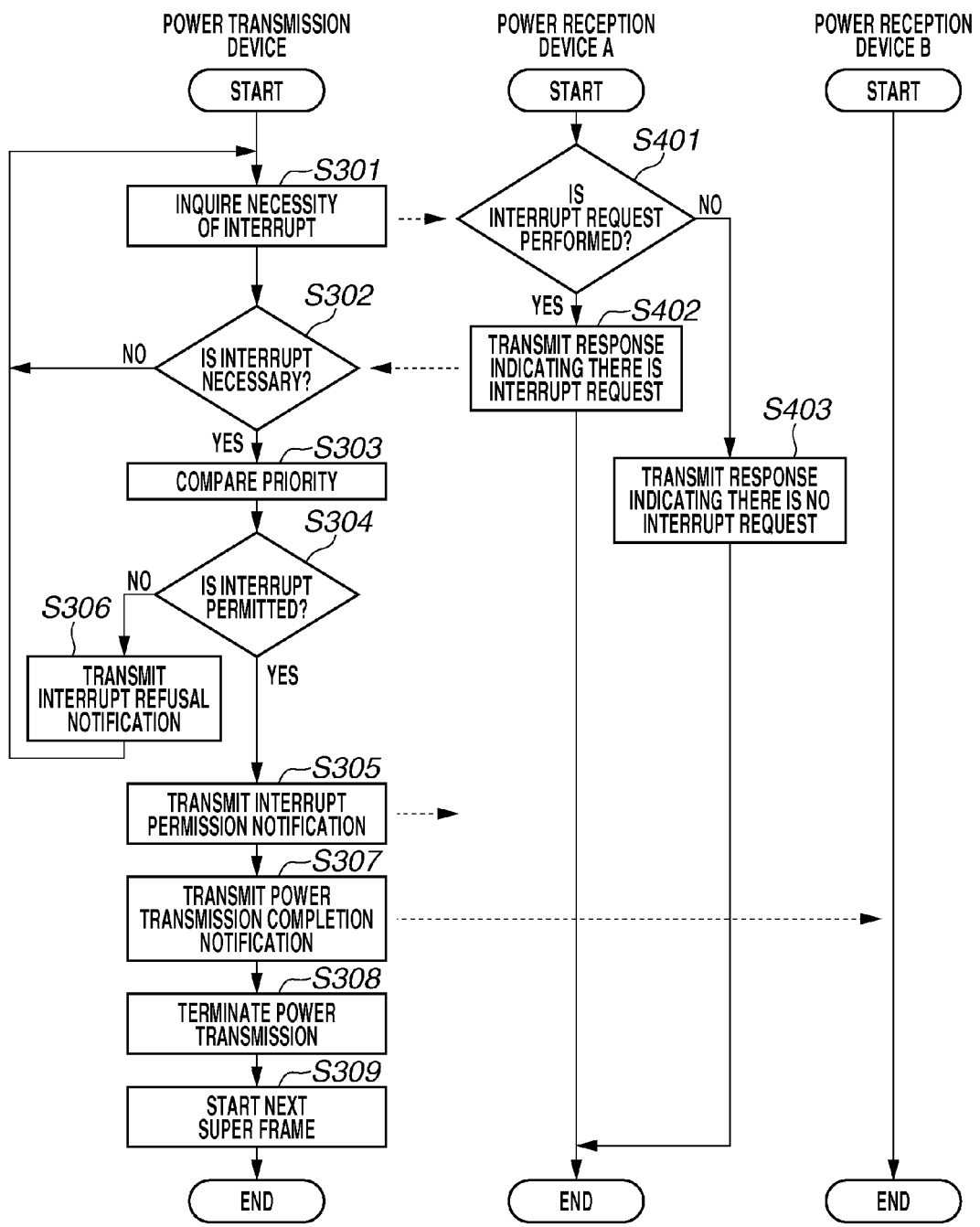
FIG. 7 is a flowchart illustrating interrupt management processing.

FIG. 7 is a flowchart illustrating interrupt management processing. The interrupt management processing is executed in parallel with the processing of the power transmission period when the power transmission period (step S103) in the power transmission processing is started. In the example illustrated in FIG. 7, a power reception device B is the power reception device 20 to which power is supplied from the power transmission device 10. Further, a power reception device A is the power reception device 20 other than the power reception device to be supplied with power.

In step S301, the CPU 111 of the power transmission device 10 transmits inquiry information to the power reception device 20 existing in the communication area 40 through the wireless transmission unit 120 by polling. Here, the inquiry information is information for inquiring of each power reception device 20 whether the power reception device 20 wishes to receive power through the interrupt management processing.

In step S401, the CPU 211 of the power reception device 20 receives the inquiry information through the wireless reception unit 230, and determines whether to perform an interrupt request. In step S401, when the CPU 211 has determined to perform interrupt (Yes in step S401), the operation proceeds to step S402. In step S402, the CPU 211 transmits a response indicating there is an interrupt request to the power transmission device 10 through the wireless transmission unit 220.

Meanwhile, in step S401, when the CPU 211 has determined not to perform interrupt (No in step S401), the operation proceeds to step S403. In step S403, the CPU 211 transmits a response indicating there is no interrupt request to the power transmission device 10 through the wireless transmission unit 220.

In response, in step S302, the CPU 111 of the power transmission device 10 receives the response to the inquiry information through the wireless reception unit 230, and confirms response content. In step S302, when the response indicates there is an interrupt request (Yes in step S302), the CPU 111 determines that the interrupt is necessary, and the operation proceeds to step S303. In step S302, when the response indicates there is no interrupt request, the CPU 111 determines that the interrupt is not necessary (No in step S302), and the operation proceeds to step S301. Note that the processing of step S302 is an example of reception processing for receiving the interrupt request.

In step S303, the CPU 111 compares a priority of the power reception device 20 (power reception device A) of the transmission source of the interrupt request and a priority of the power reception device 20 (power reception device B) that is the power reception device 20 to be supplied with power in the power transmission processing. Here, the priorities of the power reception devices 20 are set in the power transmission device 10 in advance. The power transmission device 10 stores, in the HDD 114 or the like, a priority table in which the device IDs and the priorities of the power reception devices 20 are associated with each other, for example.

Then, in step S304, the CPU 111 determines that interrupt is permitted when the priority of the power reception device 20 (power reception device A) that is the transmission source of the interrupt request is higher than the priority of the power reception device 20 (power reception device B) to be supplied with power (Yes in step S304). Meanwhile, the CPU 111 determines to refuse interrupt when the priority of the power reception device A of the transmission source of the interrupt request is equal to or less than the priority of the power reception device B to be supplied with power (NO in step S304). Note that the processing of steps S303 and S304 is an example of determination processing.

Note that there is a case in which a plurality of power reception devices 20 is to be supplied with power, in the super frame being executed when the interrupt management processing is executed. That is, there is a case in which the power reception device 20 that is being supplied with the power and the power reception device 20 that waits for the power supply exist in the super frame in execution. In this case, the CPU 111 compares the priorities of all of the power reception devices 20 to be supplied with power and the priority of the power reception device 20 that is the requestor of the interrupt request.

Then, the CPU 111 determines that interrupt is to be permitted when the priority of the power reception device 20 of the requestor of the interrupt request is higher than the priorities of all of the power reception devices 20 to be supplied with power. Meanwhile, the CPU 111 determines to refuse interrupt when the priority of the power reception device 20 of the requestor of the interrupt request is equal to or less than the priority of any one of the power reception devices 20 to be supplied with power.

In step S304, when the CPU 111 has determined that the interrupt is to be permitted, the operation proceeds to step S305. In step S305, the CPU 111 transmits interrupt permission notification to the power reception device 20 (power reception device A) of the transmission source of the interrupt request through the wireless transmission unit 120, and the operation proceeds to step S307.

Meanwhile, in step S304, when the CPU 111 has determined to refuse the interrupt, the operation proceeds to step S306 (No in step S304). In step S306, the CPU 111 transmits interrupt refusal notification to the power reception device 20 (power reception device A) of the transmission source of the interrupt request through the wireless transmission unit 120, and the operation proceeds to step S301.

In step S307, the CPU 111 transmits power transmission completion notification to the power reception device 20 (power reception device B) that is a power supply target through the wireless transmission unit 120. When a plurality of power reception devices 20 is the device to be supplied with power, the CPU 111 transmits the power transmission completion notification to all of the power reception devices 20 that are supplied with power.

Next, in step S308, the CPU 111 stops the power supply to the power reception device 20 that are supplied with power. That is, the CPU 111 terminates the power transmission. Next, in step S309, the CPU 111 terminates the super frame (Nth super frame) being executed, and starts the processing of the next super frame ((N+1)th super frame). Note that the processing of steps S308 and S309 is an example of power supply control processing for stopping the power supply to one power reception device 20 and starting the power supply to another power reception device 20.

Note that the CPU 111 of the power transmission device 10 sequentially performs the processing from the association period (step S101) in the (N+1)th super frame, following the Nth super frame terminated in the interrupt management processing. Further, as another example, in this case, the CPU 111 may determine, as a power reception device to be supplied with power, the power reception device 20 (power reception device A) of the transmission source of the interrupt request in the interrupt management processing in the (N+1)th super frame. In this case, the CPU 111 may omit the association period (step S101), and start the processing from the power transmission preparation period (step S102).

As described above, in the wireless power supply system according to the present exemplary embodiment, even in the power transmission period, the power transmission device 10 receives the interrupt request by constantly performing polling on the power reception device 20 in the interrupt management processing. The power transmission device 10 then appropriately permits the interrupt in the power transmission period, and can start the power supply to the power reception device 20 of the transmission source of the interrupt request.

That is, the wireless power supply system according to the present exemplary embodiment can appropriately supply the power to the power reception device 20 at an appropriate timing.

Next, a wireless power supply system according to a second exemplary embodiment will be described. The wireless power supply system according to the second exemplary embodiment determines permission/refusal of interrupt based on a residual capacity (electric energy) of a battery 237 in a power reception device 20 of a transmission source of an interrupt request.

Figure 8:
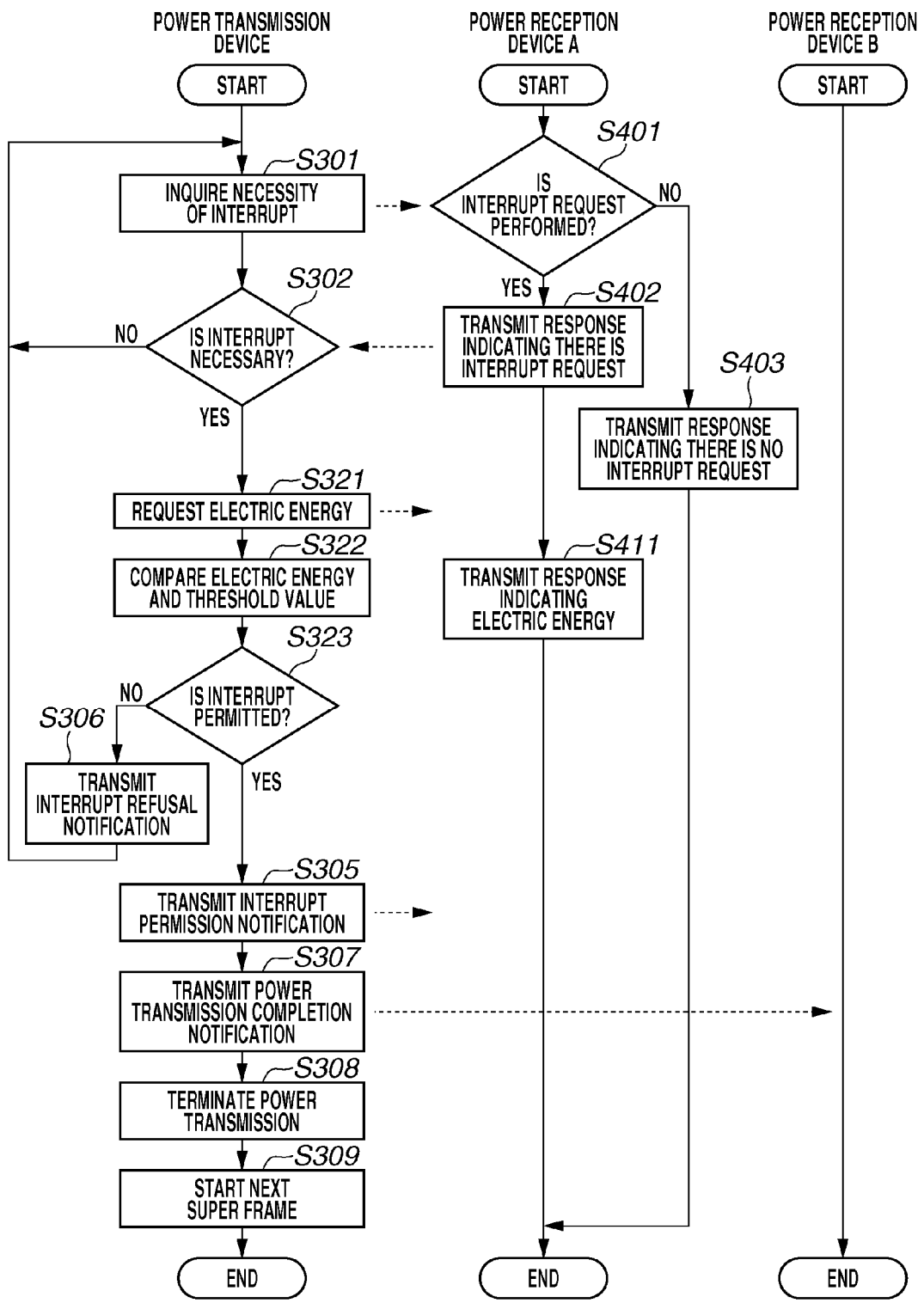
FIG. 8 is a flowchart illustrating interrupt management processing.

FIG. 8 is a flowchart illustrating interrupt management processing according to the second exemplary embodiment. Here, a part different from the interrupt management processing according to the first exemplary embodiment will be described. In step S302, the operation proceeds to step S321 when a CPU 111 of a power transmission device 10 has determined that the interrupt is necessary (Yes in step S302). In step S321, the CPU 111 transmits an electric energy request to the power reception device 20 (power reception device A) of the transmission source of the interrupt request through a wireless transmission unit 120.

In response, in step S411, when having received the electric energy request, a CPU 211 in the power reception device 20 (power reception device A) of the transmission source of the interrupt request acquires a residual capacity (electric energy) of the battery 237 from a power measurement circuit 238 through a wireless reception unit 230. The CPU 211 then transmits information indicating electric energy to the power transmission device 10 through a wireless transmission unit 220.

In step S322, the CPU 111 of the power transmission device 10 receives the electric energy information from the power reception device 20 (power reception device A) of the transmission source of the interrupt request through a wireless reception unit 130. The CPU 111 then compares the electric energy indicated by the electric energy information and a threshold value. Here, the threshold value is a value set in advance. The threshold value is, for example, stored in an HDD 114, or the like.

In step S323, the CPU 111 determines permission/refusal of interrupt based on a comparison result. To be specific, when the electric energy indicated by the electric energy information is less than the threshold value (Yes in step S323), the CPU 111 determines to permit the interrupt. Meanwhile, when the electric energy indicated by the electric energy information is equal to or more than the threshold value (No in step S323), the CPU 111 determines to refuse the interrupt.

Note that configurations and processing of the wireless power supply system according to the second exemplary embodiment other than the above are similar to those of the wireless power supply system according to the first exemplary embodiment.

As described above, the wireless power supply system according to the second exemplary embodiment determines permission/refusal of interrupt based on the electric energy of the power reception device 20 of the transmission source of the interrupt request. The wireless power supply system can appropriately supply the power to the power reception device at an appropriate timing.

As a modification example of the interrupt management processing according to the second exemplary embodiment, the power transmission device 10 may determine the permission/refusal of interrupt based on not only the electric energy of the power reception device 20 of the transmission source of the interrupt request, but also the electric energy of the power reception device 20 to be supplied with power. For example, in step S321, the CPU 111 of the power transmission device 10 transmits an electric energy request not only to the power reception device 20 of the transmission source of the interrupt request, but also to the power reception device 20 to be supplied with power in a super frame in execution. Then, in step S322, the CPU 111 also receives the electric energy information from the power reception device 20 to be supplied with power.

In step S323, the CPU 211 may determine that the interrupt is to be permitted when the electric energy of the power reception device 20 of the transmission source of the interrupt request is less than the threshold value, and the electric energy of the power reception device 20 to be supplied with power is equal to or more than the threshold value (Yes in step S323).

Next, a wireless power supply system according to a third exemplary embodiment will be described. The wireless power supply system according to the third exemplary embodiment determines permission/refusal of interrupt based on a type of device of a power reception device 20 of a transmission source of an interrupt request.

Figure 9:
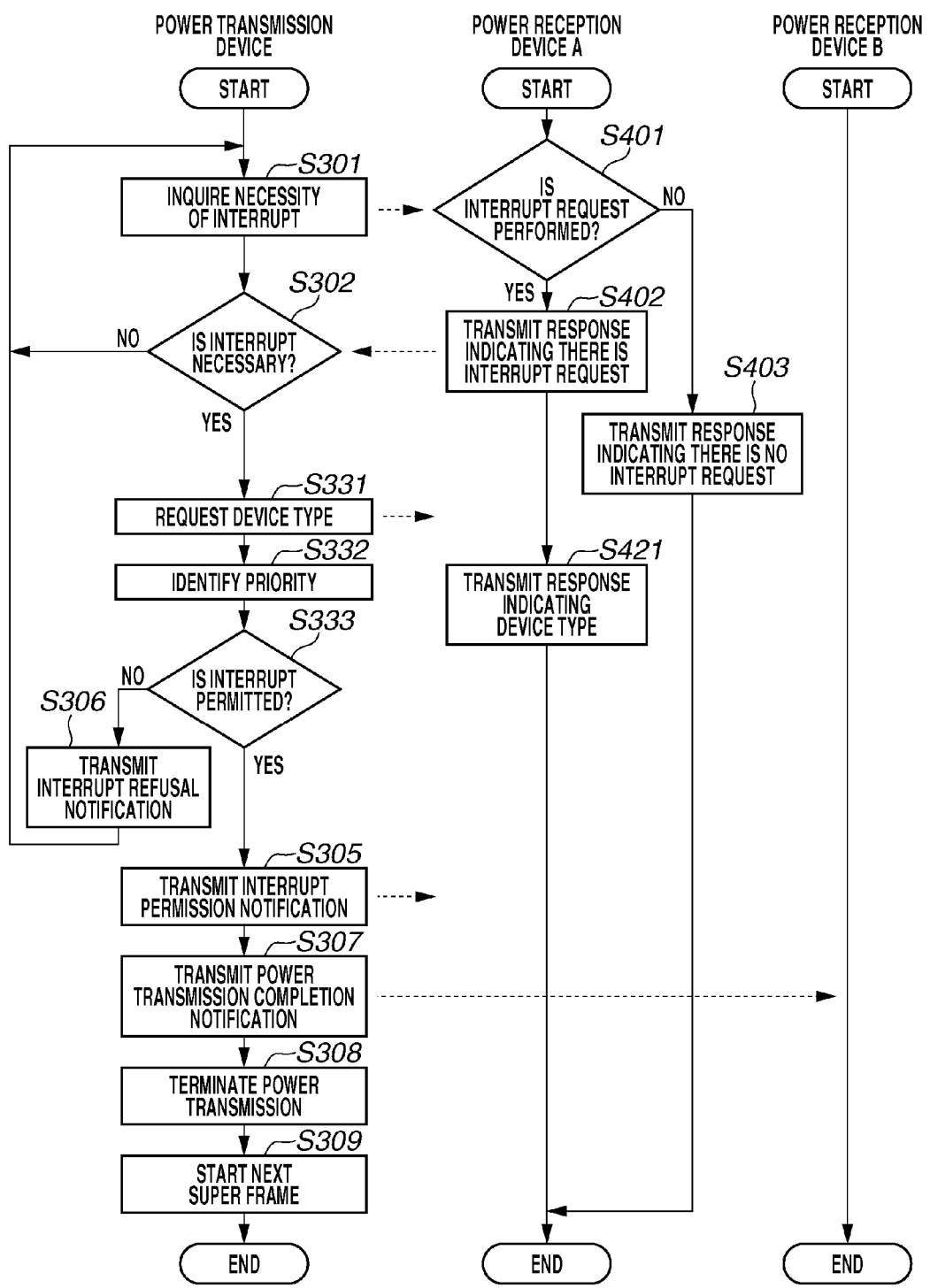
FIG. 9 is a flowchart illustrating interrupt management processing.

FIG. 9 is a flowchart illustrating interrupt management processing according to the third exemplary embodiment. Here, a part different from the interrupt management processing according to the first exemplary embodiment will be described. In step S302, the operation proceeds to step S331 when a CPU 111 of a power transmission device 10 has determined that the interrupt is necessary (Yes in step S302). In step S331, the CPU 111 transmits a device type request to a power reception device 20 of the transmission source of the interrupt request and a power reception device 20 to be supplied with power through a wireless transmission unit 120.

In response, in step S421, a CPU 211 of the power reception device 20 receives the device type request through a wireless reception unit 230. The CPU 211 then transmits device type information indicating a type of the own device to the power transmission device 10 through a wireless transmission unit 220 as a response to the device type request.

In step S332, the CPU 111 of the power transmission device 10 identifies priorities of the power reception devices 20 based on the device type indicated by the received device type information. To be specific, the power transmission device 10 stores, in an HDD 114 or the like, a priority table in which the device types and the priorities are associated with each other. For example, the priority table may associate the device types of a "mobile phone", a "PC", and a "tablet terminal" with the priorities "1", "2", and "3", respectively. The CPU 111 refers to the priority table, and identifies the priorities of the power reception devices 20.

Then, in step S333, the CPU 111 determines that the interrupt is to be permitted when the priority of the power reception device 20 of the transmission source of the interrupt request is higher than the priorities of all of the power reception devices 20 to be supplied with power (Yes in step S333). Meanwhile, the CPU 111 determines to refuse the interrupt when the priority of the power reception device 20 of the transmission source of the interrupt request is equal to or less than the priority of any of the power reception devices 20 to be supplied with power (No in step S333).

Note that configurations and processing of the wireless power supply system according to the third exemplary embodiment other than the above are similar to those of the wireless power supply systems according to other exemplary embodiments.

As described above, the wireless power supply system according to the third exemplary embodiment determines permission/refusal of interrupt based on the device type of the power reception device 20. The wireless power supply system can appropriately supply the power to the power reception device 20 at an appropriate timing.

Next, a wireless power supply system according to a fourth exemplary embodiment will be described. The wireless power supply system according to the fourth exemplary embodiment determines permission/refusal of interrupt based on a user of a power reception device 20 of a transmission source of an interrupt request.

FIG. 10 is a flowchart illustrating interrupt management processing according to the fourth exemplary embodiment. Here, a part different from the interrupt management processing according to the first exemplary embodiment will be described. In step S302, the operation proceeds to step S341 when a CPU 111 of a power transmission device 10 has determined that the interrupt is necessary (Yes in step S302). In step S341, the CPU 111 transmits a user data request to the power reception device of the transmission source of the interrupt request through a wireless transmission unit 120. The user data is information for identifying the user. The user data according to the present exemplary embodiment is a user ID that identifies the user.

In response, in step S431, a CPU 211 of the power reception device 20 receives the user data request through a wireless reception unit 230. The CPU 211 then transmits user data to the power transmission device 10 through a wireless transmission unit 220 as a response. Then, in step S342, the CPU 111 of the power transmission device 10 receives the user data through a wireless reception unit 130, and performs user authentication of the power reception device 20 based on the user data.

As a premise, the power transmission device 10 stores, in an HDD 114 or the like, in advance, the user data about which the interrupt is permitted. The CPU 111 then compares the received user data and the user data stored in the HDD 114, and determines that the user authentication is succeeded when the both user data items accord with each other.

Next, in step S343, the CPU 111 determines that the interrupt is to be permitted when the user authentication is successful (Yes in step S343). Meanwhile, the CPU 111 determines to refuse the interrupt when the user authentication has failed (No in step S343).

Note that configurations and processing of the wireless power supply system according to the fourth exemplary embodiment other than the above are similar to those of the wireless power supply systems according to other exemplary embodiments.

As described above, the wireless power supply system according to the fourth exemplary embodiment determines permission/refusal of interrupt based on the user data of the power reception device 20 of the transmission source of the interrupt request. The wireless power supply system can appropriately supply the power to the power reception device 20 at an appropriate timing.

Note that, as another example, the power transmission device 10 may determine permission/refusal of interrupt by a combination of a plurality of determination conditions for the permission/refusal of interrupt described in the exemplary embodiments.

For example, the power transmission device 10 places the highest priority on a power amount of the transmission source of the interrupt request, and may determine the permission/refusal of interrupt based on the received power amount and the priority. To be specific, assume that the electric energy of the power reception device 20 of the transmission source of the interrupt request is less than a threshold value. In this case, even if the priority of the power reception device 20 to be supplied with power is higher than the priority of the power reception device 20 of the transmission source of the interrupt request, the CPU 111 of the power transmission device 10 determines that the interrupt is to be permitted.

Other Embodiments

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2013-095507 filed Apr. 30, 2013, which is hereby incorporated by reference herein in its entirety.

What is claimed is:

1. A power transmission device that wirelessly supplies power to a power reception device, the power transmission device comprising:
   one or more processors; and
   memory storing instructions that, when executed by the one or more processors, cause the power transmission device to perform operations comprising:
   a determining, when the power transmission device has been supplying power to a first power reception device and receives a predetermined request from a second power reception device, determine whether a power supply destination is to be changed from the first power reception device to the second power reception device, based on a battery residual capacity of the second power reception device;
   a controlling, when the determining determines the power supply destination is to be changed from the first power reception device to the second power reception device, the power transmission device to stop power supply to the first power reception device and to start power supply to the second power reception device; and
   wherein, when the determining determines that the power supply destination is not to be changed from the first power reception device to the second power reception device, the power transmission device transmits to the second power reception device a refusal notification indicating that the power transmission device will not be supplying power to the second power reception device.

2. The power transmission device according to claim 1, wherein, when the battery residual capacity of the second power reception device is less than a threshold value, the determining determines that the power supply destination is to be changed from the first power reception device to the second power reception device.

3. A power supply method executed by a power transmission device that wirelessly supplies power to a power reception device, the power transmission device, the method comprising:
   when the power transmission device has been supplying power to a first power reception device and receives a predetermined request from a second power reception device, determining whether a power supply destination is to be changed from the first power reception device to the second power reception device, based on a battery residual capacity of the second power reception device;

performing power supply control, when the determining determines the power supply destination is to be changed from the first power reception device to the second power reception device, to control the power transmission device to stop power supply to the first power reception device and to start power supply to the second power reception device; and determining, when the power supply destination is not to be changed from the first power reception device to the second power reception device, the power transmission device transmits to the second power reception device a refusal notification indicating that the power transmission device will not be supplying power to the second power reception device.

4. A non-transitory computer-readable storage medium containing computer executable instructions causing a computer to execute a method for controlling a power transmission device that wirelessly supplies power to a power reception device, the method comprising:

when the power transmission device has been supplying power to a first power reception device and receives a predetermined request from a second power reception device, determining whether a power supply destination is to be changed from the first power reception device to the second power reception device, based on a battery residual capacity of the second power reception device;

performing power supply control, when the determining determines the power supply destination is to be changed from the first power reception device to the second power reception device, to control the power transmission device to stop power supply to the first power reception device and to start power; and determining, when the power supply destination is not to be changed from the first power reception device to the second power reception device, the power transmission device transmits to the second power reception device a refusal notification indicating that the power transmission device will not be supplying power to the second power reception device.

5. A power transmission device that wirelessly supplies power to a power reception device, the power transmission device comprising:

one or more processors; and memory storing instructions that, when executed by the one or more processors, cause the power transmission device to perform operations comprising:

a determining, when the power transmission device has been supplying power to a first power reception device and receives a predetermined request from a second power reception device, whether a power supply destination is to be changed from the first power reception device to the second power reception device, based on a battery residual capacity of the first power reception device and a battery residual capacity of the second power reception device;

a controlling, when the determining determines that the power supply destination is to be changed from the first power reception device to the second power reception device, the power transmission device to stop power supply to the first power reception device and to start power supply to the second power reception device; and wherein, when the determining determines that the power supply destination is not to be changed from the first power reception device to the second power reception device, the power transmission device transmits to the second power reception device a refusal notification indicating that the power transmission device will not be supplying power to the second power reception device.

6. The power transmission device according to claim 5, wherein, when the battery residual capacity of the first power reception device is equal to or more than a threshold value, and the battery residual capacity of the second power reception device is less than the threshold value, the determining determines that the power supply destination is to be changed from the first power reception device to the second power reception device.

7. A power supply method executed by a power transmission device that wirelessly supplies power to a power reception device, the method comprising:

when the power transmission device has been supplying power to a first power reception device and receives a predetermined request from a second power reception device, determining whether a power supply destination is to be changed from the first power reception device to the second power reception device, based on a battery residual capacity of the first power reception device and a battery residual capacity of the second power reception device; and performing control, when it is determined that the power supply destination is to be changed from the first power reception device to the second power reception device, to control the power transmission device to stop power supply to the first power reception device and to start power supply to the second power reception device; and determining, when the power supply destination is not to be changed from the first power reception device to the second power reception device, the power transmission device transmits to the second power reception device a refusal notification indicating that the power transmission device will not be supplying power to the second power reception device.

8. A non-transitory computer-readable storage medium containing computer executable instructions causing a computer to execute a method for controlling a power transmission device that wirelessly supplies power to a power reception device, the method comprising:

when the power transmission device has been supplying power to a first power reception device and receives a predetermined request from a second power reception device, determining whether a power supply destination is to be changed from the first power reception device to the second power reception device, based on a battery residual capacity of the first power reception device and a battery residual capacity of the second power reception device;

performing control, when it is determined that the power supply destination is to be changed from the first power reception device to the second power reception device, to control the power transmission device to stop power supply to the first power reception device and to start power supply to the second power reception device; and determining, when the power supply destination is not to be changed from the first power reception device to the second power reception device, the power transmission device transmits to the second power reception device a refusal notification indicating that the power transmission device will not be supplying power to the second power reception device.

* * * * *